United States Patent
Kurihara

(10) Patent No.: US 9,848,589 B2
(45) Date of Patent: Dec. 26, 2017

(54) KNOB OF FISHING REEL AND METHOD OF FABRICATING THE SAME

(71) Applicant: Globeride, Inc., Tokyo (JP)

(72) Inventor: Sho Kurihara, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 533 days.

(21) Appl. No.: 14/468,980

(22) Filed: Aug. 26, 2014

(65) Prior Publication Data

US 2015/0060587 A1   Mar. 5, 2015

(30) Foreign Application Priority Data

Aug. 30, 2013 (JP) ................. 2013-179957

(51) Int. Cl.
*A01K 89/01* (2006.01)
*A01K 89/00* (2006.01)

(52) U.S. Cl.
CPC ....... *A01K 89/006* (2013.01); *Y10T 29/49908* (2015.01)

(58) Field of Classification Search
CPC  A01K 89/00; A01K 89/006; Y10T 29/49908; Y10T 29/49938; Y10T 29/4994; Y10T 29/49945
See application file for complete search history.

(56) References Cited

U.S. PATENT DOCUMENTS

| | | | | |
|---|---|---|---|---|
| 2,704,668 A * | 3/1955 | Park, Sr. | ................. | A63B 53/14 473/300 |
| 5,328,128 A * | 7/1994 | Morris | ................. | A01K 89/006 242/283 |
| 5,660,344 A * | 8/1997 | Testa | ................. | A01K 89/006 242/283 |
| 6,105,891 A * | 8/2000 | Ikuta | ................. | A01K 89/006 242/283 |
| 2006/0071107 A1 | 4/2006 | Ochiai et al. | | |
| 2006/0283999 A1* | 12/2006 | Savakis | ................ | A01K 89/006 242/283 |

(Continued)

FOREIGN PATENT DOCUMENTS

| | | |
|---|---|---|
| CN | 1757284 | 4/2006 |
| JP | 56135893 U | 10/1981 |
| JP | 63-15776 | 2/1988 |

(Continued)

OTHER PUBLICATIONS

Chinese Office Action dated Jan. 25, 2016 for Appln. No. 201410403306.1.

(Continued)

*Primary Examiner* — Emmanuel M Marcelo
(74) *Attorney, Agent, or Firm* — Pillsbury Winthrop Shaw Pittman, LLP

(57) ABSTRACT

One object is to provide a knob of a fishing reel that can be fabricated easily at low cost and with high strength. In accordance with one aspect, a knob of a fishing reel includes a core rotatably supported via a spindle, and a tubular grip member formed of an elastic material and fitted round the core, wherein the core is provided with a deformation-applying portion for contacting the inner surface of the grip member and causing the outer shape of the grip member to deform and bulge in a direction orthogonal to the axis of the spindle.

8 Claims, 25 Drawing Sheets

(56) References Cited

U.S. PATENT DOCUMENTS

2008/0257996 A1   10/2008   Ochiai et al.
2014/0378242 A1*  12/2014   Chalifoux .............. A63B 53/14
                                                                     473/299

FOREIGN PATENT DOCUMENTS

| JP | 2008-005793 A | 1/2008 |
| JP | 2009-261367 A | 11/2009 |
| JP | 2010-193855 A | 9/2010 |
| JP | 2011-004681 | 1/2011 |
| JP | 2011-083225 | 4/2011 |

OTHER PUBLICATIONS

Extended European Search Report dated Feb. 2, 2015 for Appl. No. 14182567.9.
Chinese Office Action dated Sep. 23, 2016 for Appln. No. 201410403306.1.
Chinese Office Action dated May 6, 2016 for Appln. No. 201410403306.1.
Chinese Office Action dated Jul. 22, 2016 for Appln. No. 201410403306.1.
European Office Action dated Sep. 1, 2016 for Appln. No. 14182567.9.
Non-Final Office Action Japanese Patent Application No. 2013-179957 dated Dec. 6, 2016 with English translation.
Non-final Office Action Japanese Patent Application No. 2013-179957 dated Jul. 11, 2017 with full English translation.

* cited by examiner front ← → rear

KNOB OF FISHING REEL AND METHOD OF FABRICATING THE SAME

CROSS-REFERENCE TO RELATED APPLICATIONS

This application is based on and claims the benefit of priority from Japanese Patent Application Serial No. 2013-179957 (filed on Aug. 30, 2013), the contents of which are hereby incorporated by reference in their entirety.

TECHNICAL FIELD

The present invention relates to a knob of a fishing reel and a method of fabricating the knob.

BACKGROUND

Conventionally, a fishing reel such as a spinning reel or a double-axis reel has a handle mounted on an end of a handle shaft. The handle includes a handle arm and a knob mounted on an end of the handle arm (see, e.g., Japanese Patent Application Publication No. 2011-4681 (the "'681 Publication")).

The knob of the '681 Publication includes a core rotatably supported by the handle arm via a spindle and a tubular grip member fitted round the core.

The outer surface of the core has a plurality of round grooves formed therein and spaced in the axial direction of the core. The round grooves serve as clearance for receiving excess adhesive used to fix the grip member. On an end of the core is screwed a cap for fixing the grip member.

Such a knob can be fabricated by fixing the grip member on the core via an adhesive and then screwing a cap member onto the end of the core.

The '681 Publication has been suffering a problem that fixing the grip member on the core requires troublesome application of the adhesive, which leads to low productivity and high costs.

Additionally, it was difficult to keep the amount of applied adhesive constant and there was possibility that the adhesion between the core and the grip member is broken due to an external force imparted when the grip member is gripped for rotational operation. Thus, the strength of the fixing is instable.

SUMMARY

The present invention is intended to overcome the above problems, and one object of the present invention is to provide a knob of a fishing reel and a method of fabricating the knob wherein the knob can be fabricated easily at low cost and with high strength.

To overcome these problems, a knob of a fishing reel of the present invention includes a core rotatably supported via a spindle, and a tubular grip member formed of an elastic material and fitted round the core, wherein the core is provided with a deformation-applying portion for contacting the inner surface of the grip member and causing the outer shape of the grip member to deform and bulge in a direction orthogonal to the axis of the spindle.

In this knob of a fishing reel, when the grip member is fitted round the core, the deformation-applying portion provided in the core contacts and presses the inner surface of the grip member. This pressing causes the outer shape of the grip member to deform and bulge in the direction orthogonal to the axis of the spindle.

The inner surface of the grip member is cylindrical; and the sectional shape of the deformation-applying portion in the direction orthogonal to the axis is preferably noncircular. With this arrangement, the deformation-applying portion having a noncircular shape contacts and presses the circular inner surface of the grip member in a suitable manner. Thus, the outer shape of the grip member suitably deforms and bulges in the direction orthogonal to the axis of the spindle to a shape similar to the noncircular sectional shape of the core.

The deformation-applying portion preferably has a polygonal sectional shape. With this arrangement, the angles of the core having a polygonal shape contact and press the inner surface of the grip member. Thus, the outer shape of the grip member deforms and bulges in the direction orthogonal to the axis of the spindle to a generally polygonal shape similar to the outer shape of the core.

Further, the deformation-applying portion of the core may be provided with a locking portion for locking the inner surface of the grip member. Thus, the locking portion restricts the movement of the grip member.

A method of fabricating a knob of a fishing reel of the present invention is a method of fabricating a knob of a fishing reel including a core rotatably supported via a spindle and a tubular grip member formed of an elastic material and fitted round the core, the core having a deformation-applying portion in an outer surface thereof, the method comprising the step of: pressing, in the course of fitting the grip member round the core, the deformation-applying portion against an inner surface of the grip member to cause elastic deformation of the grip member, such that an outer shape of the grip member deforms and bulges in a direction orthogonal to an axis of the core.

In this method of fabricating the knob of a fishing reel, when the grip member is fitted round the core, the deformation-applying portion provided in the core contacts and presses the inner surface of the grip member. This pressing causes elastic deformation of the grip member whereby the outer shape of the grip member deforms and bulges in the direction orthogonal to the axis of the spindle.

In the knob of a fishing reel of the present invention, when the grip member is fitted round the core, the deformation-applying portions of the core contacts and presses the inner surface of the grip member. This pressing suitably fixes the grip member on the core. Accordingly, the knob can be easily fabricated at low cost. Additionally, since the grip member is so elastic as to squeeze the core, the grip member is fixed on the core with high strength.

Further, since the grip member is fixed on the core with high strength, the grip member can be suitably prevented from sliding round the axis of the core. This arrangement may increase the operability of the knob.

Since the outer shape of the grip member deforms and bulges, the grip area can be increased Thus, for example, if the knob is provided on a handle arm of a fishing reel, the knob can be gripped suitably even for high load winding when a fish is caught. Accordingly, the handle can be operated with a sufficient operational power.

Since the outer shape of the core can be reflected on the outer shape of the grip member, a plurality of types of knobs which deform and bulge to different outer shapes can be obtained by using a plurality of types of cores having different outer shapes. In this case, only one type of grip member having a predetermined outer shape is required; therefore, knobs that can be used for a plurality of types of fishing reels can be obtained at low cost.

With the arrangement wherein the inner surface of the grip member is cylindrical and the sectional shape of the deformation-applying portion in the direction orthogonal to the axis is noncircular, the deformation-applying portion having a noncircular shape contacts and presses the circular inner surface of the grip member in a suitable manner. Thus, pressing between the core and the grip member having different shapes enables the grip member to be suitably fixed on the core. Since the core and the grip member have different shapes, the grip member can be fixed on the core with high strength. Particularly if the deformation-applying portion has an angle, the angle digs into and presses the inner surface of the grip member; thereby increasing the strength of the fixing. The angle of the deformation-applying portion also serves as a detent for preventing the grip member from sliding round the axis of the core.

Further, if the deformation-applying portion has a polygonal section, the angles of the core having a polygonal shape contact and press the inner surface of the grip member, thereby increasing the strength of the fixing.

In an arrangement where the deformation-applying portion is provided with a locking portion, the locking portion restricts the movement of the grip member and thus prevents the grip member from coming off of the core. This arrangement increases the strength of the fixing.

In the method of fabricating the knob of a fishing reel of the present invention, when the grip member is fitted round the core, the deformation-applying portions of the core contacts and presses the inner surface of the grip member. This pressing suitably fixes the grip member on the core. Accordingly, the knob can be easily fabricated at low cost. Additionally, since the grip member is fitted so as to squeeze the core, the grip member is fixed on the core with high strength.

DESCRIPTION OF EXAMPLE EMBODIMENTS

Embodiments of a knob of a fishing reel according to the present invention will now be described with reference to the drawings. In the following description, the directions referred to as "front and rear" and "left and right" are based on those shown in FIG. 1. The same elements are denoted with the same numeral and free of duplicate description.

First Embodiment

Figure 1A:
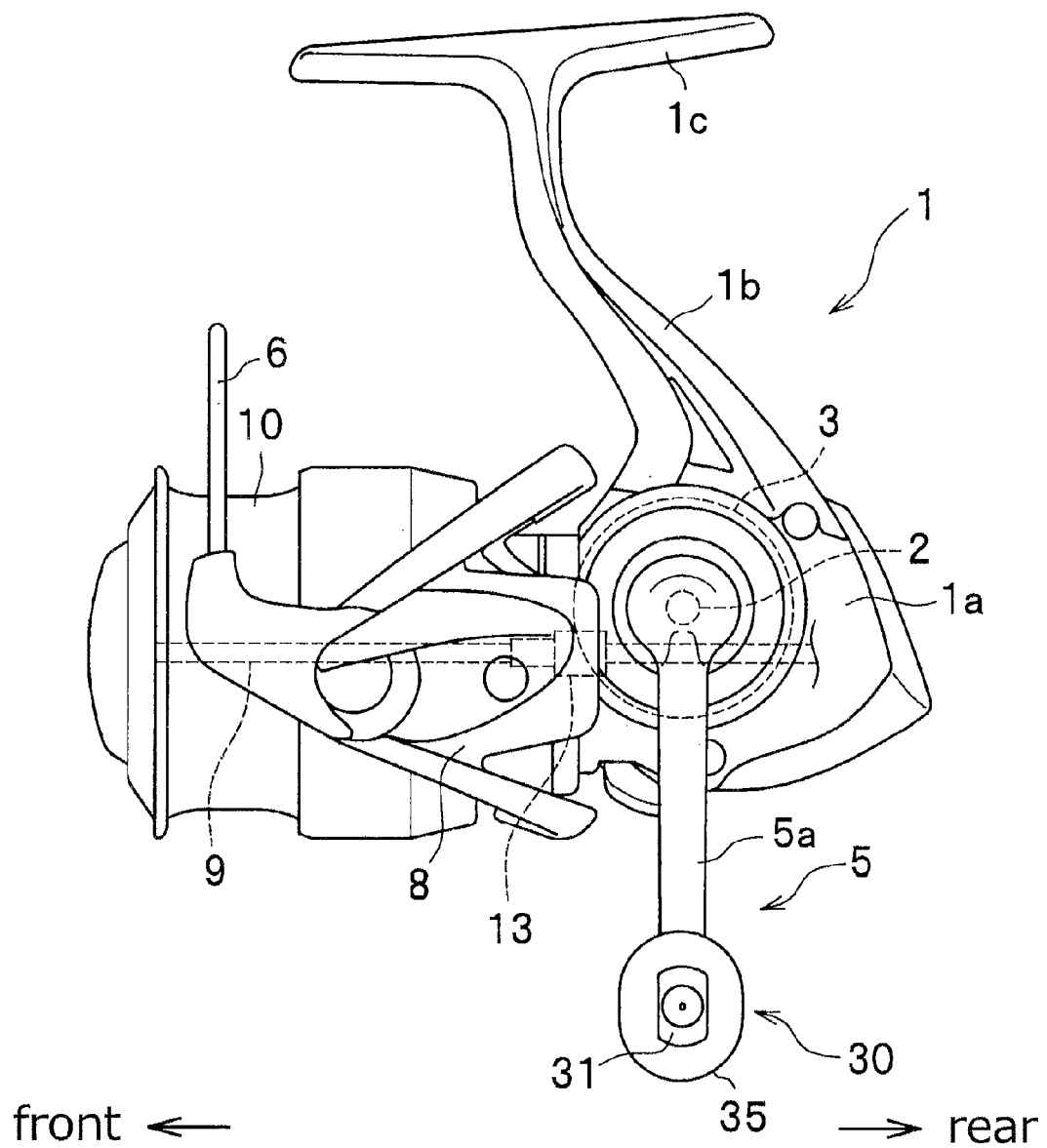
FIG. 1a is a side view of a fishing reel equipped with a knob according to a first embodiment of the present invention.

As shown in FIG. 1a, a spinning reel 1 as a fishing reel may include a reel body 1a, a leg 1b extending from the reel body 1a, and a rod attachment portion 1c formed at an end of the leg 1b for attachment on a fishing rod not shown. In the reel body 1a, a handle shaft 2 may be rotatably supported so as to serve as a drive shaft on which a handle 5 is fixed. On the handle shaft 2 may be fixed a drive gear 3, which may mesh with a tubular pinion gear 13 extending orthogonally to the handle shaft 2 and supported rotatably by the reel body 1a via a bearing. On an end of the pinion gear 13 may be integrally mounted a rotor 8 via a rotor nut not shown. The rotor 8 may include a bail 6 and a line guide.

In the reel body 1a, a spool shaft 9 may extend orthogonally to the handle shaft 2. The spool shaft 9 may be disposed through the pinion gear 13 and concentrically with the pinion gear 13 so as to be operable to reciprocate in front-and-rear direction orthogonal to the handle shaft 2. Further, on an end of the spool shaft 9 may be mounted a spool 10 round which a line is to be wound.

The drive gear 3 may engage with an oscillating mechanism not shown via the pinion gear 13. The oscillating mechanism may include a worm shaft (a traverse cam shaft) that rotates in mesh with the pinion gear 13 and a slider that meshes with the grooves in the worm shaft and is mounted on the spool shaft 9 so as to be immobile in the axial direction thereof. When the handle shaft 2 is rotated by the rotational operation of the handle 5, the oscillating mechanism may reciprocate the spool shaft 9 (in the front-and-rear direction) along the axial direction.

With this arrangement, when the handle 5 is rotationally operated to cause the handle shaft 2 to rotate, the spool 10 mounted on the spool shaft 9 via the oscillating mechanism may be reciprocated in the front-and-rear direction; and additionally, the rotor 8 may be rotationally driven via the drive gear 3 and the pinion gear 13.

Figure 1B:
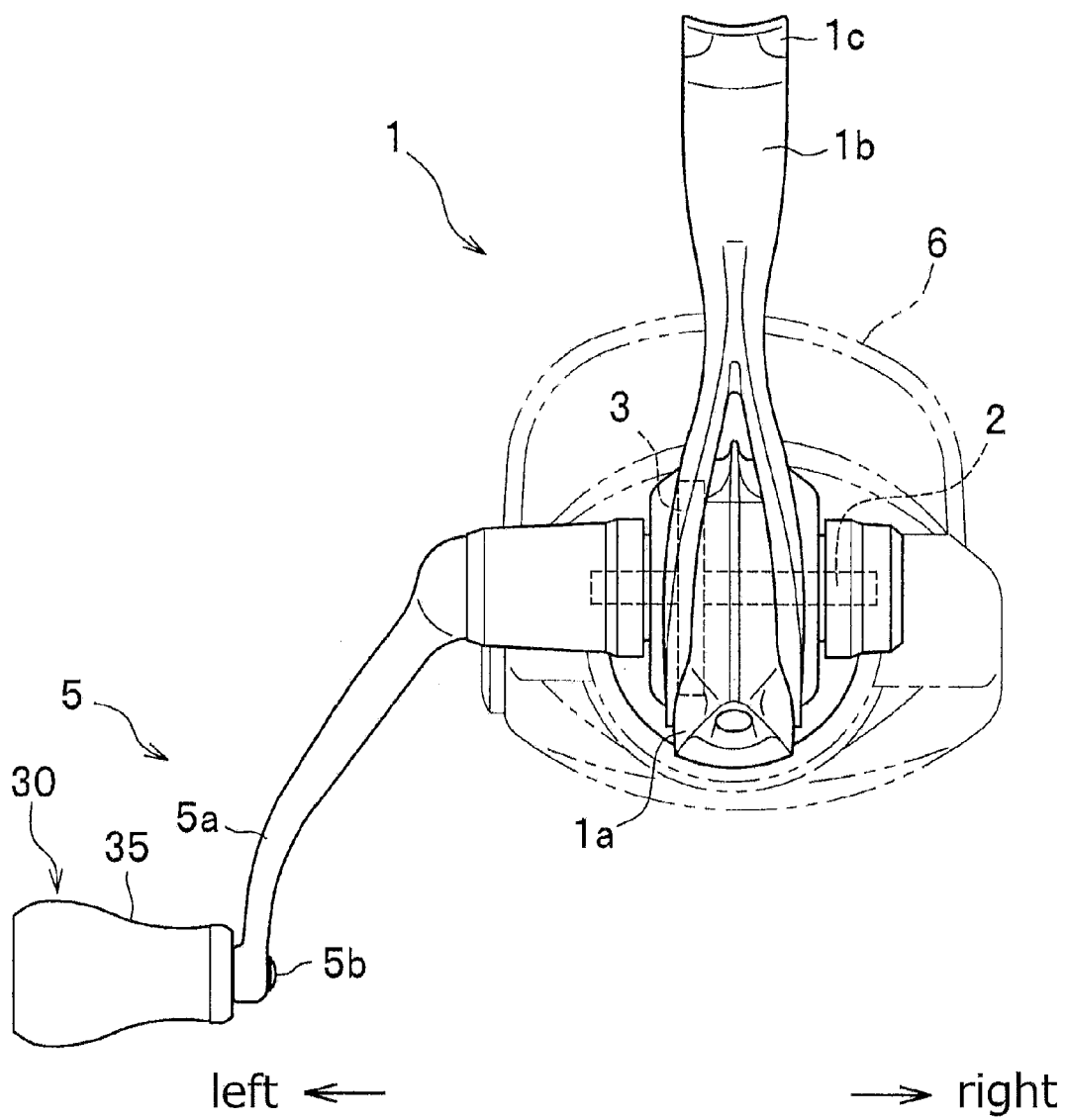
FIG. 1b is a rear view of the same.

As shown in FIG. 1b, the handle shaft 2 may extend in the left-and-right direction which is orthogonal to the spool shaft 9 (see FIG. 1a) in the reel body 1a such that the handle 5 can be mounted on either left or right side. More specifically, both left and right portions of the handle shaft 2 may be rotatably supported by the reel body 1a via a bearing not shown, and the left and right ends of the handle shaft 2 on which the handle 5 is fixed may be aligned with openings formed in the left and right sides of the reel body 1a, respectively, such that the handle shaft 2 extend to the left and right sides of the reel body 1a.

Figure 2A:
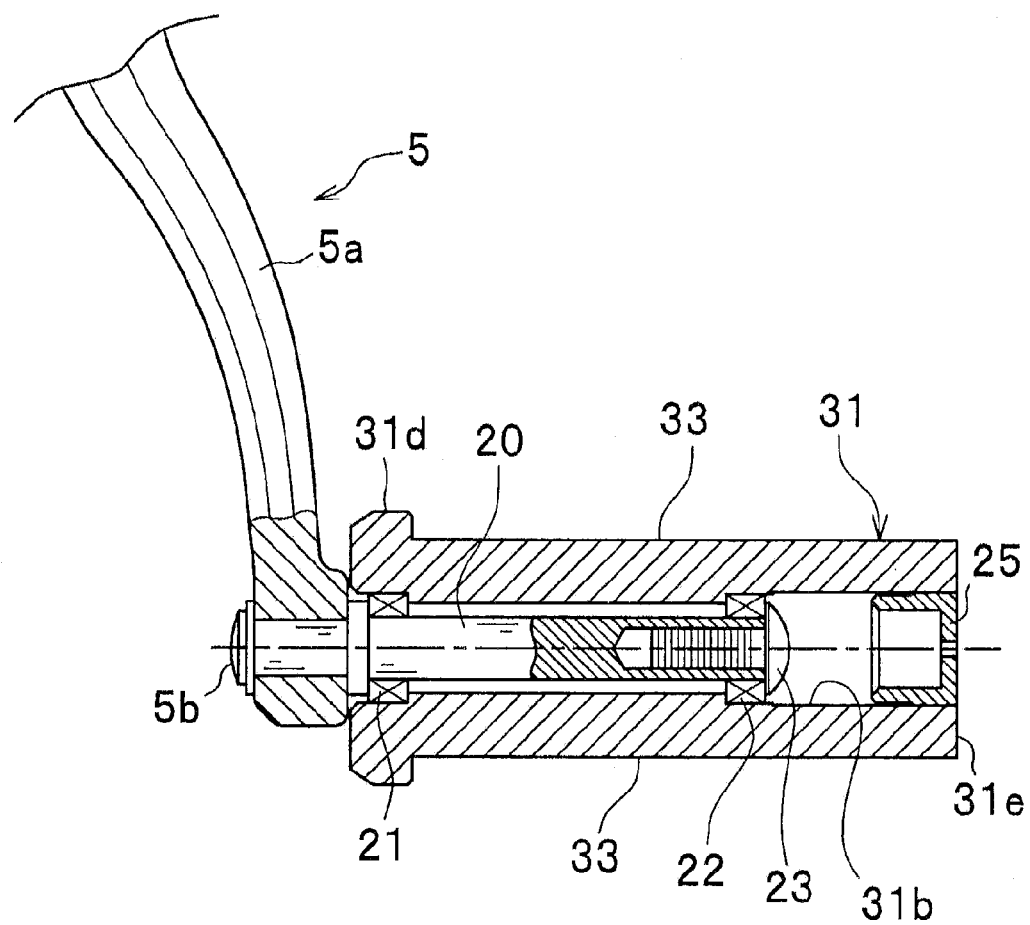
FIG. 2a is a sectional view of a core.

The handle 5, which can be mounted removably on the handle shaft 2, may include a handle arm 5a to be connected to the handle shaft 2, a spindle 20 fixedly mounted on an end of the handle arm 5a with a pin 5b (see FIG. 2a), and a knob 30 rotatably mounted on the spindle 20 so as not to come off.

An embodiment of the knob 30 of the present invention applied to the handle 5a will be hereinafter described.

Figure 3A:
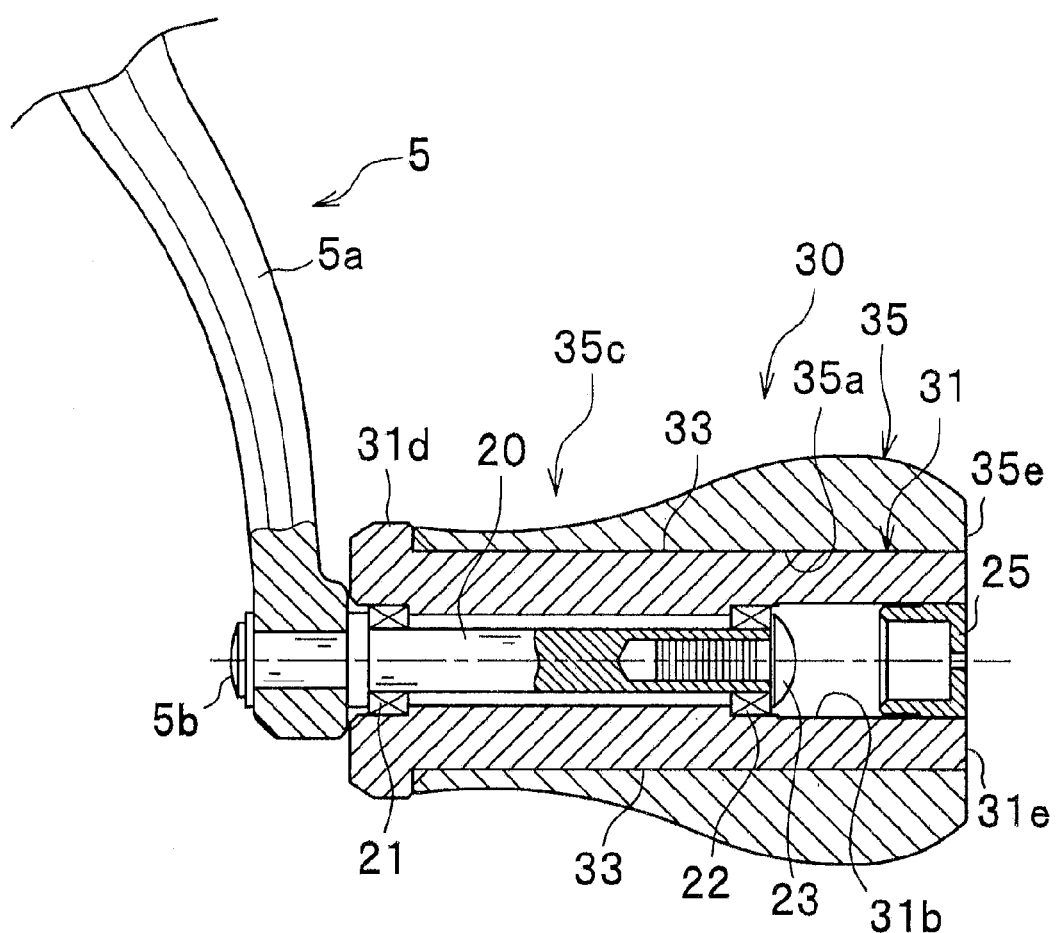
FIG. 3a is a sectional view of the knob.

As shown in FIG. 3a, the knob 30 may include a core 31 rotatably mounted on the spindle 20 so as not to come off and made of metal, resin, etc., and a grip member 35 fitted round the outer circumferential surface of the core 31 and capable of elastic deformation.

The core 31 may be rotatably mounted on the spindle 20 via the bearings 21, 22 so as to encompass the spindle 20 and may be secured on the spindle 20 via a screw 23 screwed into an end of the spindle 20.

As shown in FIG. 3a, the core 31 may be in a generally quadrangular prism shape having a generally rectangular longitudinal section (side surfaces) (see FIG. 4a) and have a pair of opposed plain surfaces 32 and a pair of curved surfaces 33 adjacent to the pair of plain surfaces 32. The joints between the pair of plain surfaces 32 and the pair of curved surfaces 33 may be formed round.

Figure 2B:
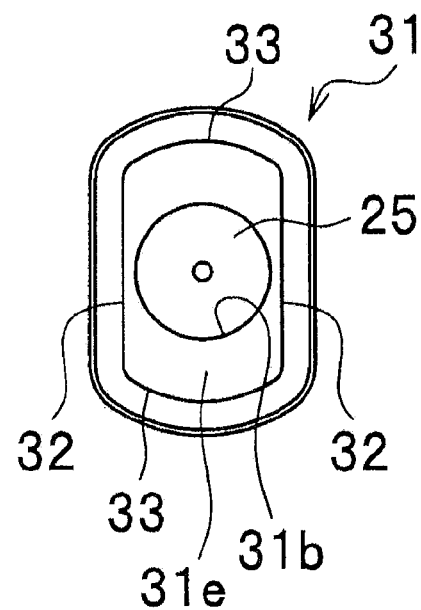
FIG. 2b is a side view of the core.

The core 31 may have an insertion hole 31b into which the spindle 20 is to be inserted. As shown in FIGS. 2 and 3, a cap 25 may be mounted in an opening of the insertion hole 31b. Additionally, a flange portion 31d is formed in the proximal end of the core 31. The flange portion 31d may abut on an end of the grip member 35 (see FIG. 3a).

Figure 2C:
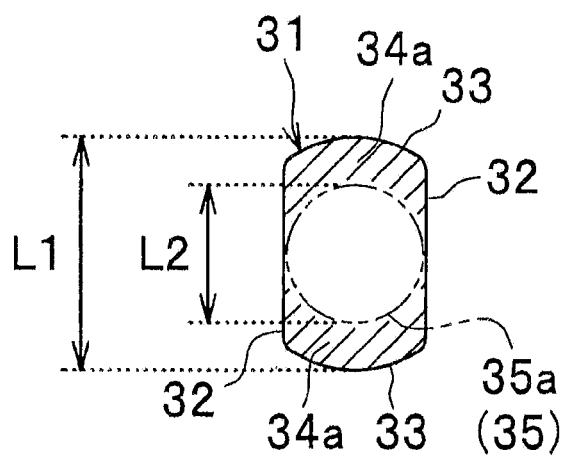
FIG. 2c shows the relationship in size between an inner surface of a grip member and the core.

As shown in FIG. 2c, the core 31 may include protrusions 34a, 34a (shaded in the figure) protruding radially beyond the inner surface 35a (represented by a broken line in the figure) of the grip member 35, as the core 31 is aligned concentrically with the grip member 35. The protrusions 34a, 34a may include a pair of curved surfaces 33. When the grip member 35 is fitted round the core 31, the protrusions 34a, 34a may contact and press the inner surface 35a of the grip member 35 in a direction orthogonal to the axial direction of the spindle 20. Due to this pressing, the outer shape of the grip member 35 may deform and bulge in a direction orthogonal to the axial direction of the spindle 20. The protrusions 34a, 34a correspond to "deformation-applying portions" recited in the claims.

Figure 4A:
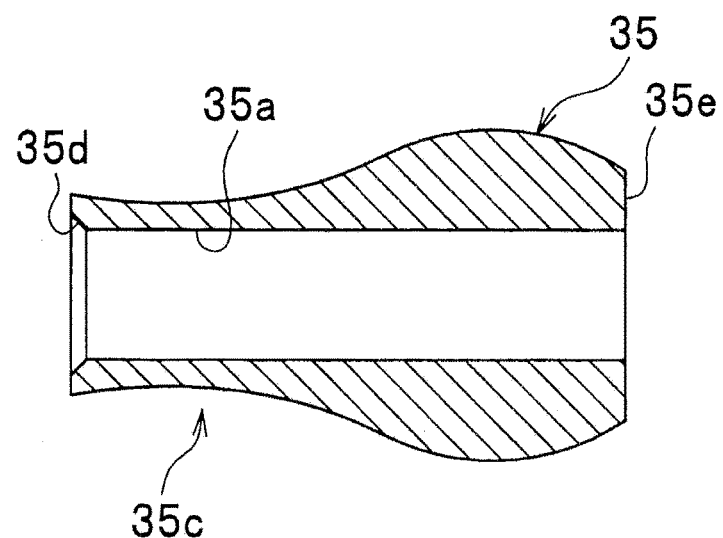
FIG. 4a is a sectional view of the grip member.
Figure 4B:
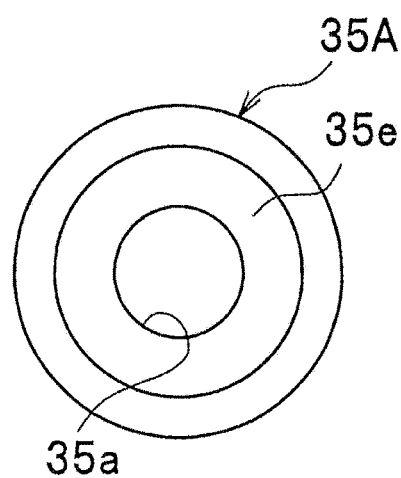
FIG. 4b is a side view of the grip member.

As shown in FIGS. 4a and 4b, the grip member 35 may have a cylindrical shape. The grip member 35 may be formed by cutting operation on a synthetic resin such as ethylene vinyl acetate copolymerization resin (EVA resin) and may have a circular outer shape as viewed from the sides. As shown in FIG. 2c, the inner surface 35a of the grip member 35 has an inner diameter L2 smaller than the maximum radial dimension L1 of the core 31.

The edge 35d of the end opening of the grip member 35 may be chamfered. As shown in FIG. 3a, the side end surface 35e of the grip member 35 may be flush with the distal end surface 31e of the core 31.

The grip member 35 may be formed of an elastic material such as rubber.

The grip member 35 as described above may be fitted round the core 31 as follows.

Figure 5A:
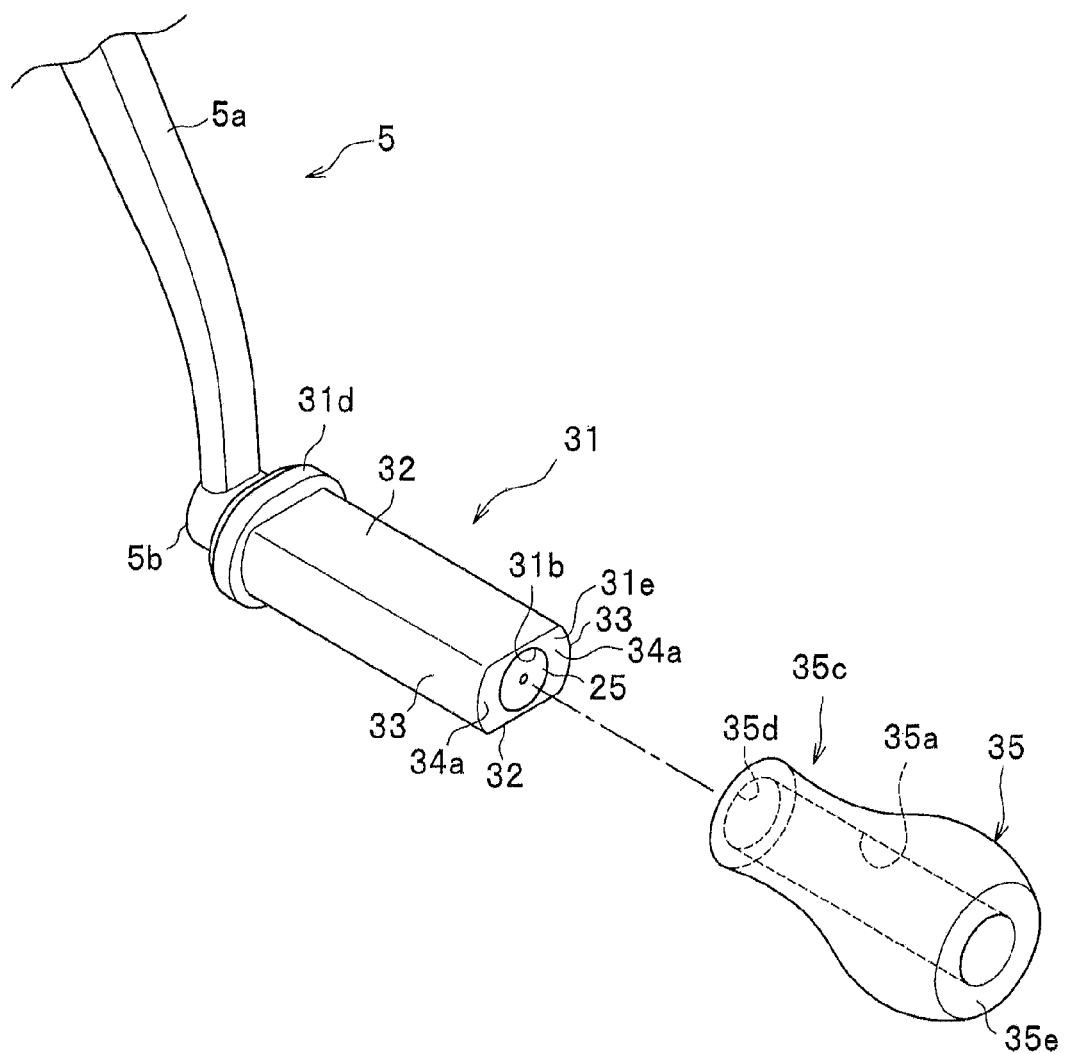
FIG. 5a is a perspective view showing how to fabricate the knob.

First, as shown in FIG. 5a, the grip member 35 may be brought close to the core 31 until the edge 35d of the end opening of the grip member 35 contacts the distal end of the core 31. Then, the grip member 35 may be forced in the axial direction of the core 31 such that the edge 35d of the opening end of the grip member 35 is pressed and expanded by the distal end of the core 31.

Figure 4C:
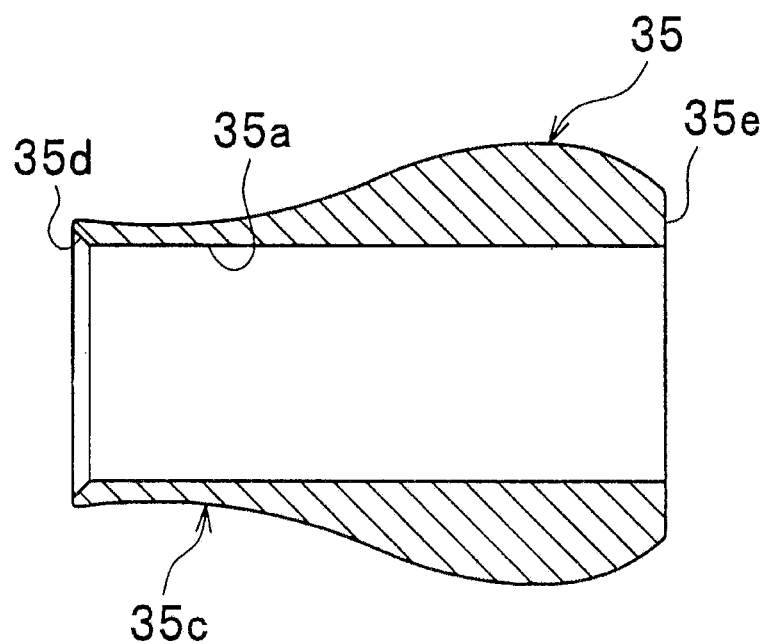
FIG. 4c is a sectional view of the grip member fitted round the core.
Figure 4D:
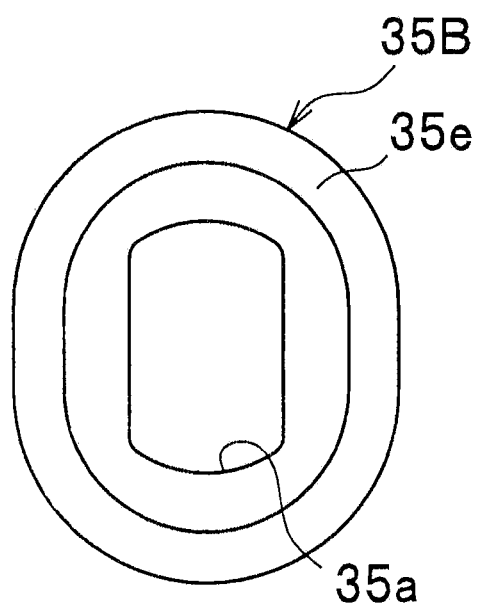
FIG. 4d is a side view of the grip member fitted round the core.
Figure 4E:
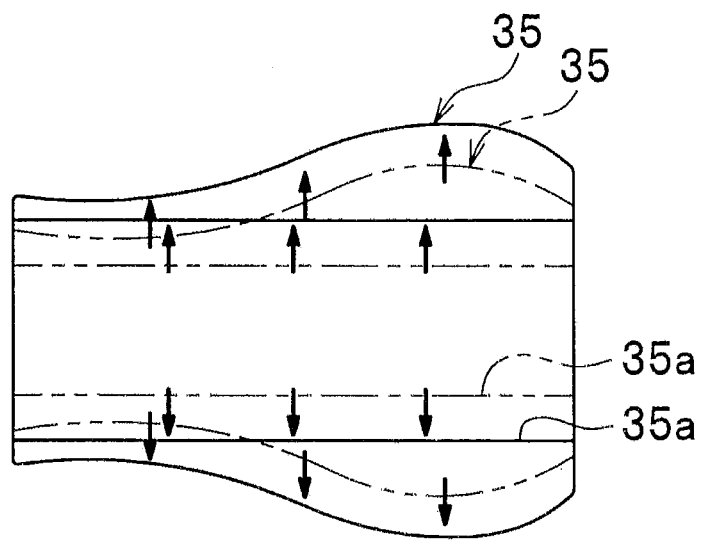
FIG. 4e is a diagram comparing the outer shapes of the grip member before and after fitting.
Figure 4F:
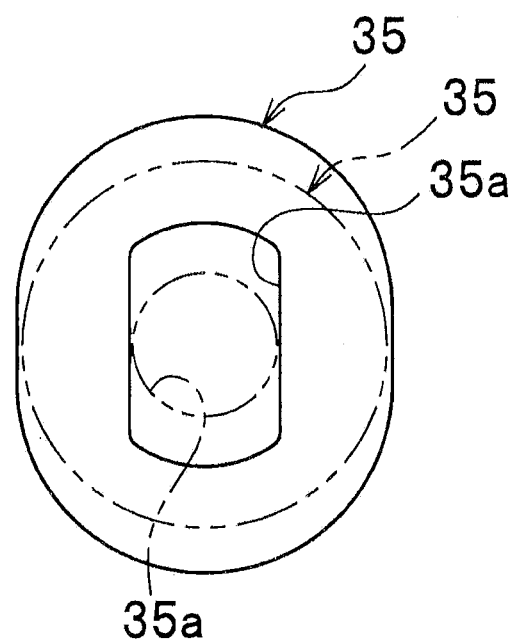
FIG. 4f is a side view comparing the outer shapes of the grip member before and after fitting.

Thus, the protrusions 34a, 34a of the core 31 may contact and press the inner surface 35a of the grip member 35, causing the outer shape of the grip member 35 to deform and bulge in a direction orthogonal to the axial direction of the spindle 20 (see FIGS. 4c and 4d). As shown in FIGS. 4e and 4f, when the grip member 35 is fitted round the core 31, the pressing by the core 31 (the protrusions 34a, 34a) may affect the outer shape of the grip member 35 and cause the outer shape of the grip member 35 to deform in the direction of the arrows in the figure (in the direction orthogonal to the axial direction) to be similar to the outer shape of the core 31 (the protrusions 34a, 34a).

Figure 3B:
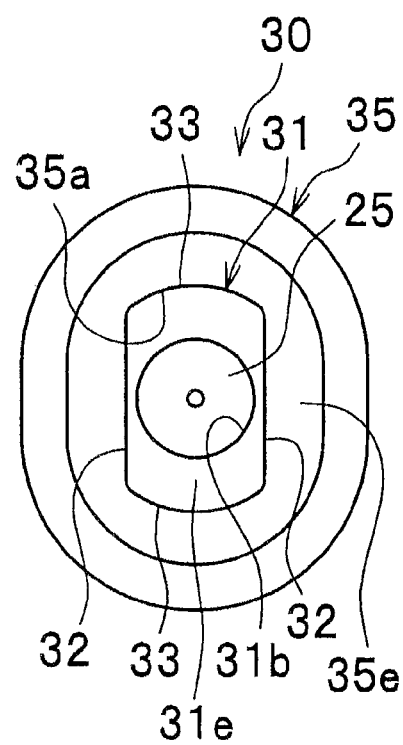
FIG. 3b is a side view of the knob.
Figure 5B:
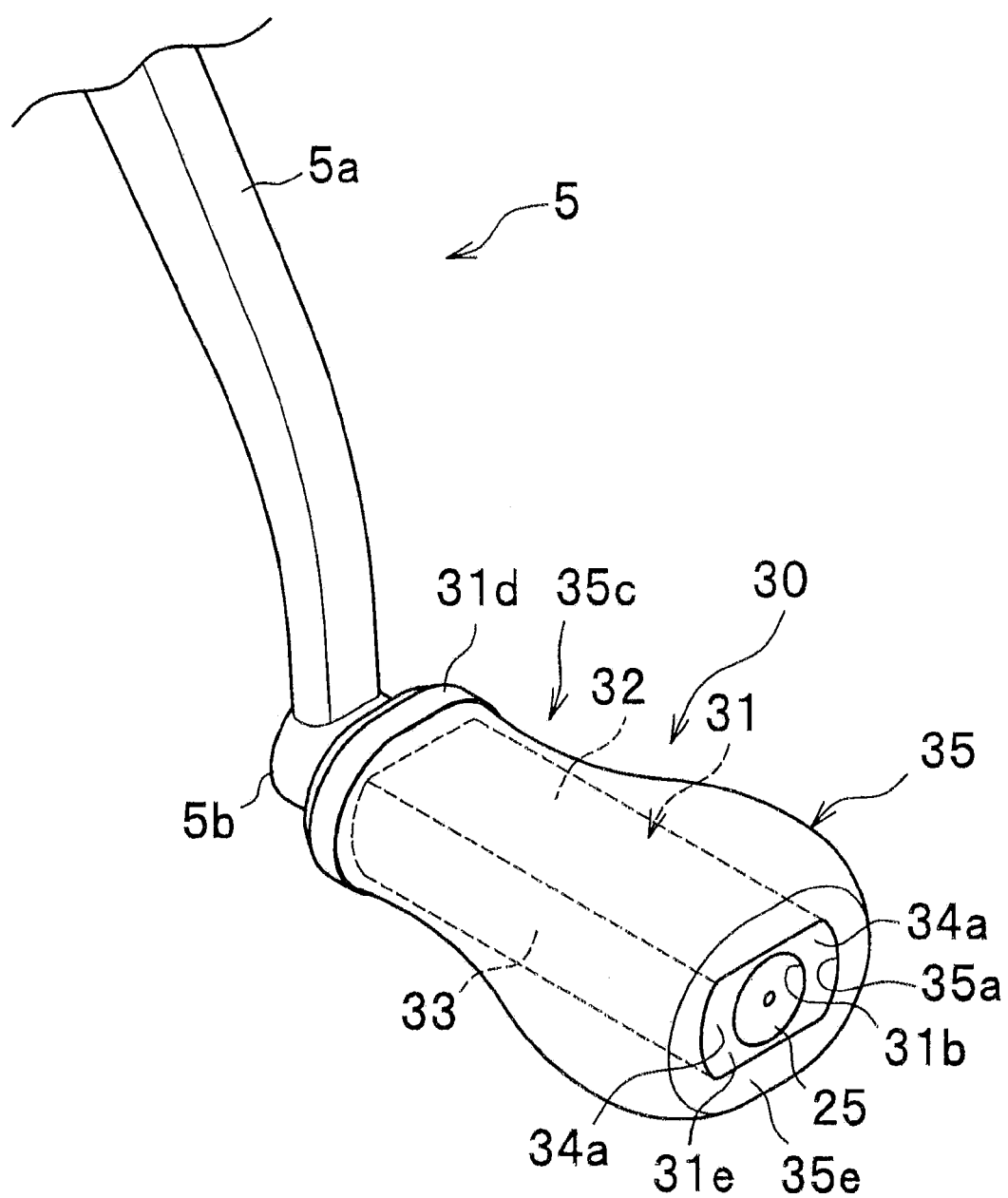
FIG. 5b is a perspective view showing a fabricated knob.

Thus, a flat knob 30 is produced as shown in FIG. 5b (see FIGS. 3a and 3b).

As described above, when the grip member 35 is fitted round the core 31, the protrusions 34a, 34a of the core 31 may contact and press the inner surface 35a of the grip member 35 in a direction orthogonal to the axial direction. This pressing may suitably fix the grip member 35 on the core 31. Accordingly, the knob 30 can be easily fabricated at low cost. Additionally, since the grip member 35 is so elastic as to squeeze the core 31, the grip member 35 may be fixed on the core 31 with high strength.

Further, since the grip member 35 is fixed on the core 31 with high strength, the grip member 35 can be suitably prevented from sliding round the axis of the core 31. This arrangement may increase the operability of the knob.

Since the outer shape of the grip member 35 deforms and bulges, the grip area may be increased, making it possible to suitably grip the knob 30 even for high load winding when a fish is caught. Accordingly, the handle 5 can be operated with a sufficient operational power.

Particularly in this embodiment, the proximal portion 35c of the grip member 35 (see FIGS. 3a and 5b) with a small thickness may have an outer shape similar to that of the core 31; therefore, the grip member 35 can be gripped with a stable grip power for rotational operation. Thus, the feeling in operation may be enhanced.

Since the outer shape of the core 31 can be reflected on the outer shape of the grip member 35, a plurality of types of knobs 30 which deform and bulge to different outer shapes can be obtained by using a plurality of types of cores 31 having different outer shapes. In this case, only one type of grip member 35 having a predetermined outer shape is required; therefore, knobs 30 that can be used for a plurality of types of spinning reels 1 can be obtained at low cost.

If the grip member 35 is made of EVA resin, the grip member 35, which may be formed by a cutting operation, can only be circular as viewed from the sides; however, the cores 31 in the embodiment having different shapes can provide the grip member 35 with outer shapes that were conventionally impossible (to produce knobs 30 noncircular as viewed from the sides).

Since the core 31 and the grip member 35 have different shapes, the grip member 35 can be fixed on the core 31 with high strength.

Second Embodiment

Figure 6A:
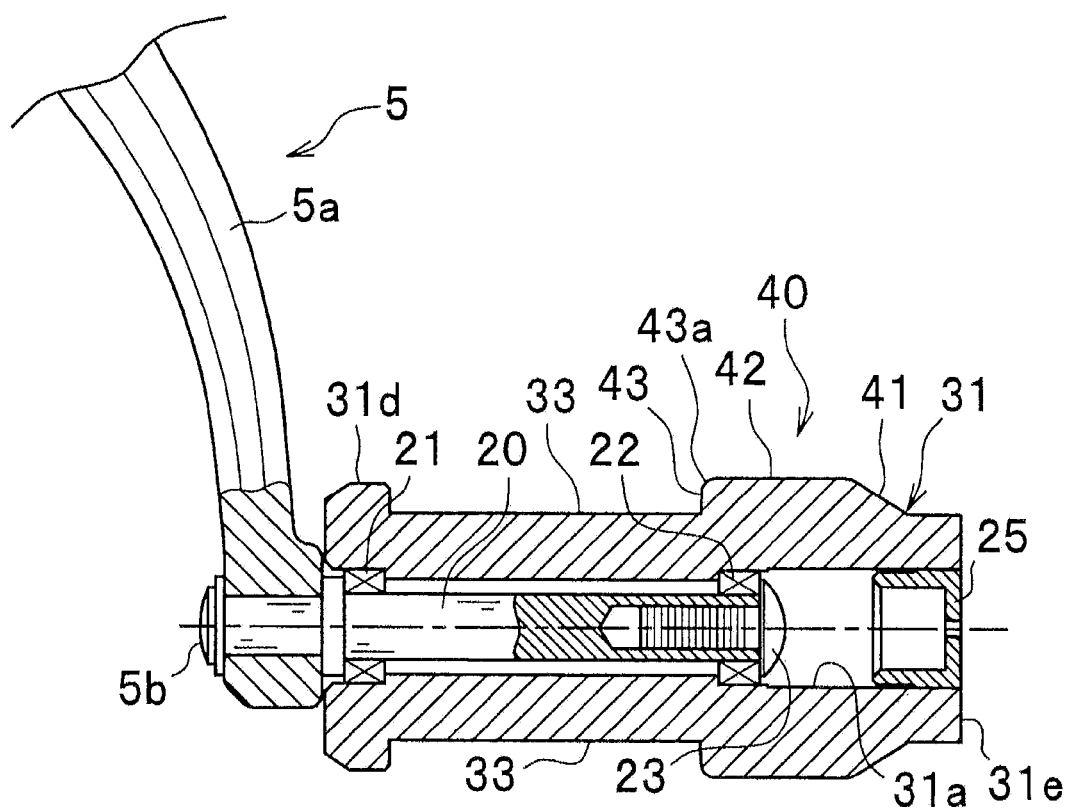
FIG. 6a is a sectional view of a core of a knob according to a second embodiment of the present invention.
Figure 6B:
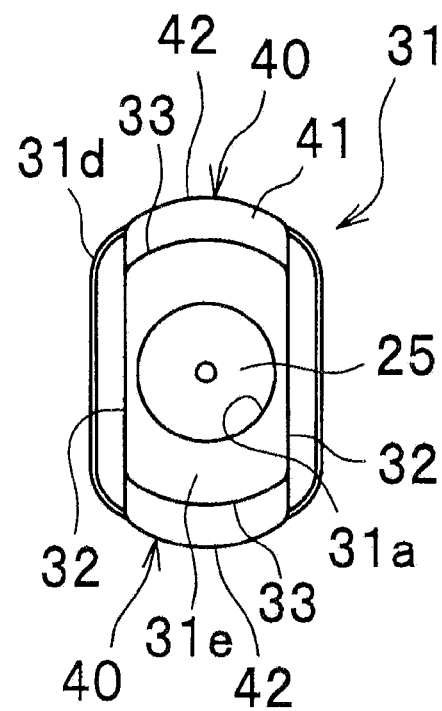
FIG. 6b is a side view of the core.
Figure 6C:
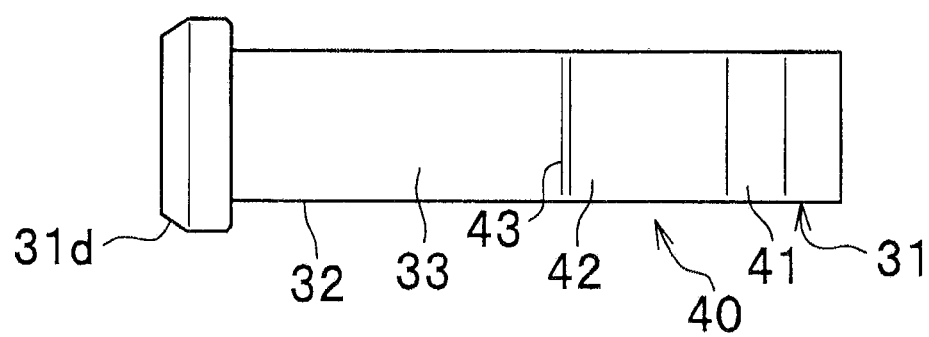
FIG. 6c is a plan view of the core.

Next, the second embodiment of the knob of a fishing reel will now be described with reference to FIGS. 6 and 7.

This embodiment is different from the first embodiment in that the outer surface (the curved surfaces 33, or the outer surfaces of the protrusions 34a, 34a) of the core 31 may be provided with locking portions 40 projecting therefrom.

Figure 7A:
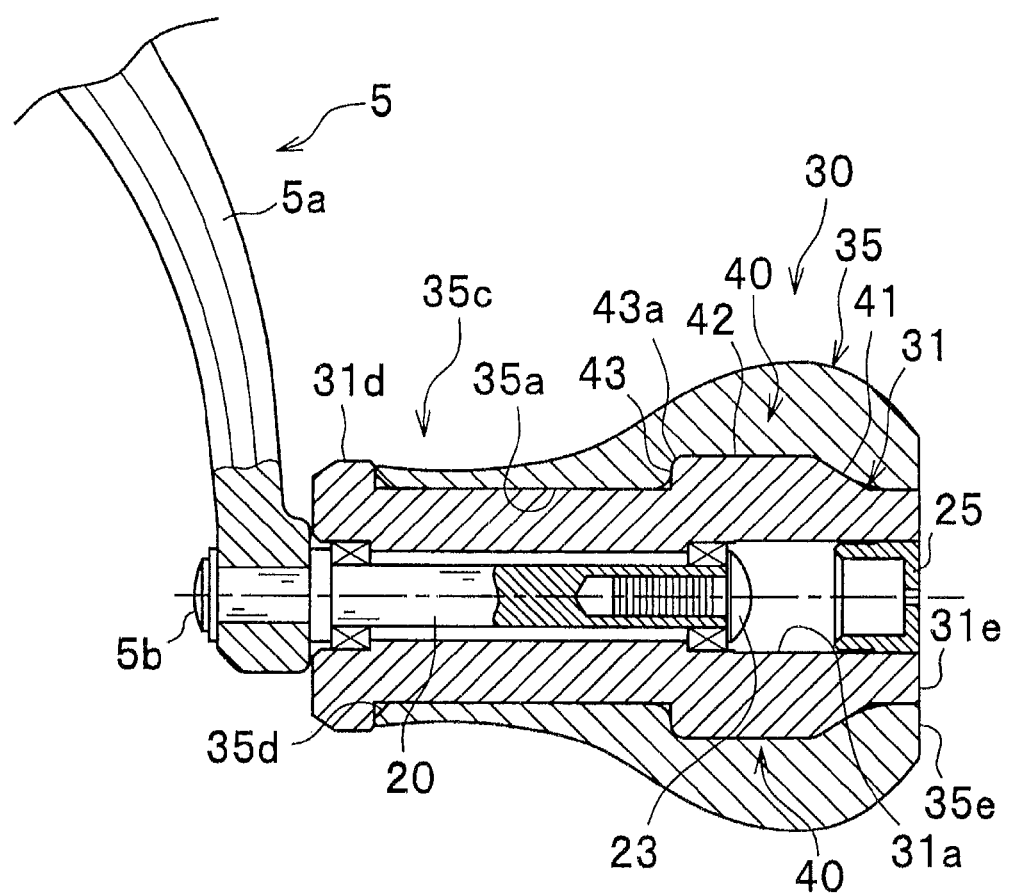
FIG. 7a is a sectional view of the knob according to the second embodiment.
Figure 7B:
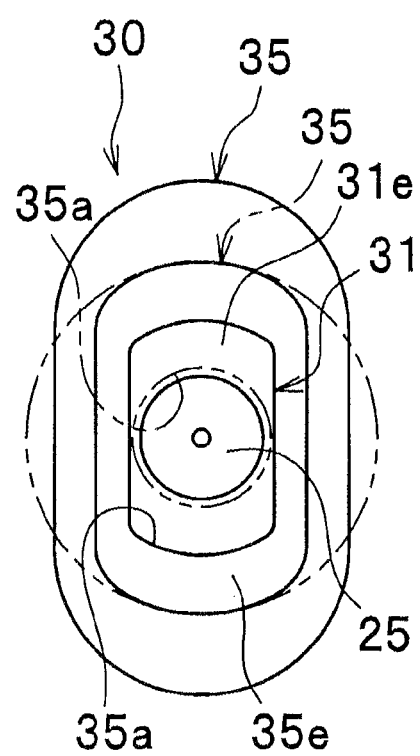
FIG. 7b is a side view of the same.

The locking portions 40 may be formed on the pair of curved surfaces 33 and may each include a sloped part 41, a linear part 42, and a locking part 43. The sloped part 41 may be sloped such that it is higher in the direction in which the grip member 35 is forced to be fitted round the core 31, so as not to prevent the fitting operation of the grip member 35. The linear part 42 may be continuous to the sloped part 41 and press the inner surface 35a of the grip member 35 (see FIG. 7a). The locking part 43 may be a surface continuous to an end of the linear part 42 and extending in a generally radial direction of the spindle 20. As shown in FIG. 7a, the corner 43a of the locking part 43 may contact with and dig into the inner surface 35a of the grip member 35 when the grip member 35 is fitted round the core 31. Additionally, the grip member 35 before fitting is represented with a broken line in FIG. 7b.

In this embodiment, the locking portions 40 may suitably prevent the grip member 35 from coming off of the core 31 and increase the strength of the fixing.

The locking portion 40 may be provided on one of the pair of curved surfaces 33. Alternatively, the locking portions 40 may be provided on one or both of the pair of plain surfaces 32 or may be provided on the pair of curved surfaces 33 and the pair of plain surfaces 32.

Further, the locking portions 40 may be provided at staggered positions in the axial direction of the spindle 20.

The locking portion 40 may have any desired shape as long as it projects from the curved surfaces 33 (the outer surfaces of protrusions 34a, 34a) to press the inner surface 35a of the grip member 35. Also, the locking portion 40 may cause the outer shape of the grip member 35 to deform and bulge.

Third Embodiment

Next, the third embodiment of the knob of a fishing reel will now be described with reference to FIG. 8.

This embodiment may be different from the first and the second embodiments in having detents 45, 46 projecting from the outer surface of the core 31.

Figure 8A:
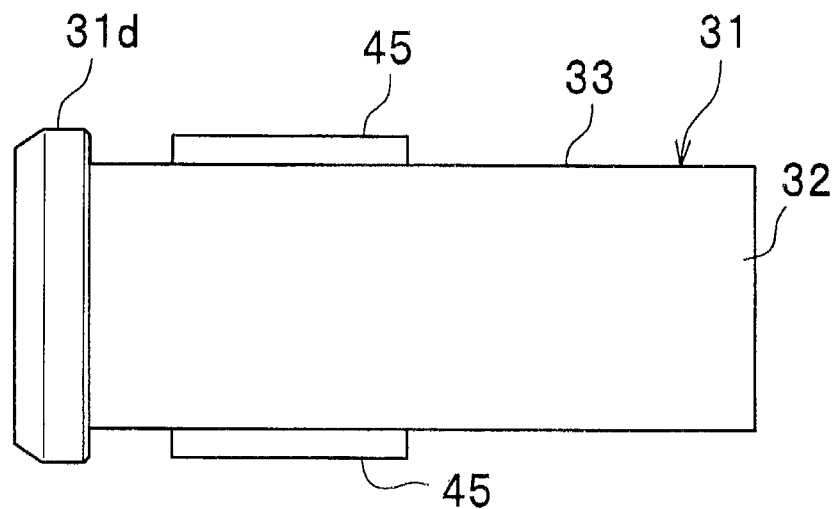
FIG. 8a is a front view showing a first example of a core of a knob according to a third embodiment of the present invention.
Figure 8B:
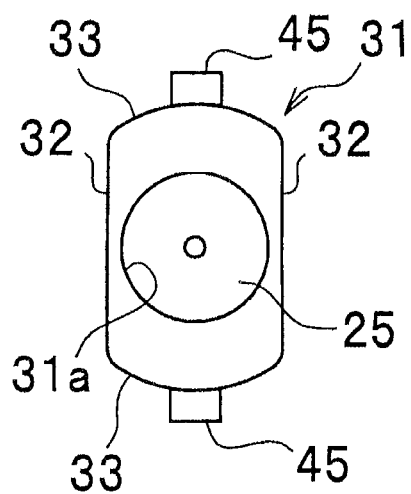
FIG. 8b is a side view showing the first example of the same.

In the examples shown in FIGS. 8a and 8b, detents 45 may be provided on the pair of curved surfaces 33. The detents 45 may extend in the axial direction of the core 31 and contact the inner surface 35a of the grip member 35 (see FIG. 4a).

The detents 45 may restrict the grip member 35 from sliding round the axis of the core 31.

Figure 8C:
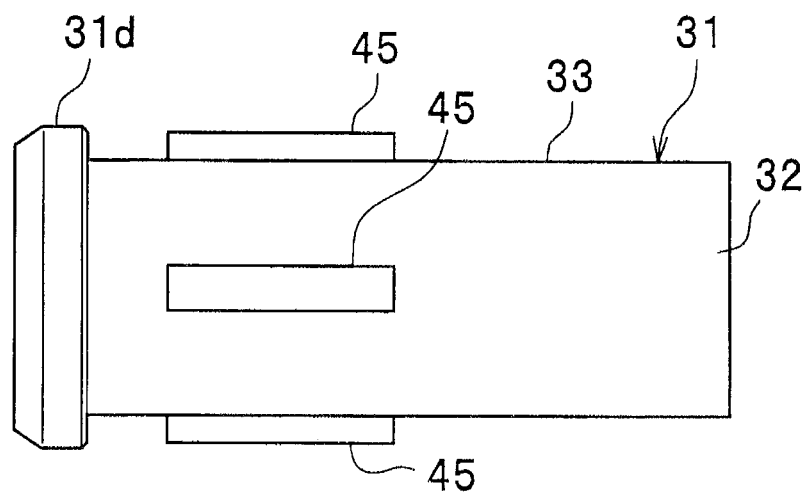
FIG. 8c is a front view showing a second example of the same.
Figure 8D:
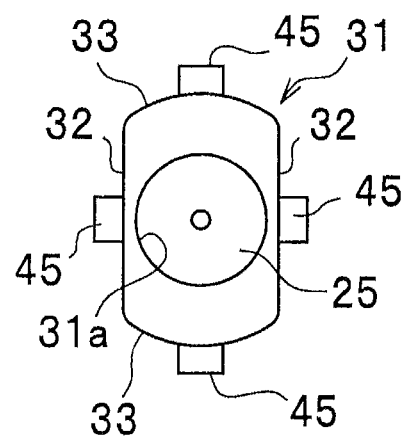
FIG. 8d is a side view showing the second example of the same.

In the examples shown in FIGS. 8c and 8d, detents 45 may be provided on the pair of curved surfaces 33 and the pair of plain surfaces 32. The detents 45 may contact the inner surface 35a of the grip member 35 (see FIG. 4a).

Figure 8E:
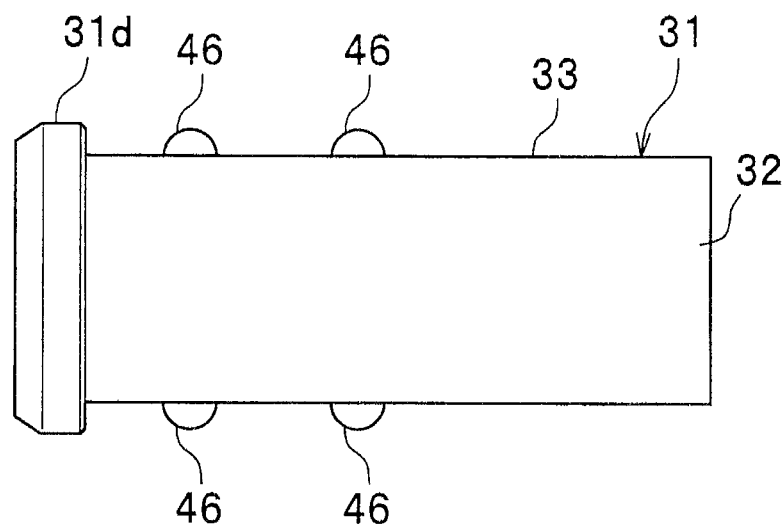
FIG. 8e is a front view showing a third example of the same.
Figure 8F:
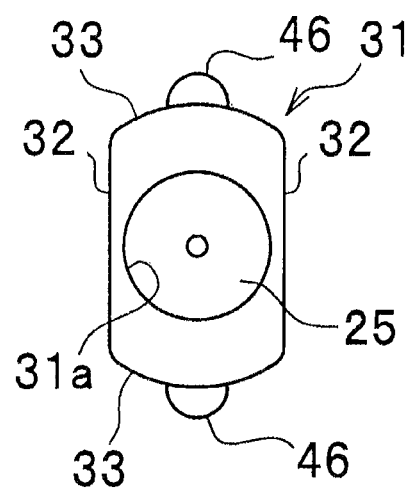
FIG. 8f is a side view showing the third example of the same (a flange is omitted from each of the side views).

In the examples shown in FIGS. 8e and 8f, hemispheric detents 46 may be provided on the pair of curved surfaces 33. Each of the curved surfaces 33 may have two detents 46 spaced in the axial direction of the core 31. The detents 46 may contact the inner surface 35a of the grip member 35 (see FIG. 4a).

In this embodiment, the detents 45, 46 may suitably prevent the grip member 35 from sliding round the axis of the core 31 This arrangement may increase the operability of the knob.

Further, the detents 45, 46 may also serve as the locking portions 40 described above.

Fourth Embodiment

Next, the fourth embodiment of the knob of a fishing reel will now be described with reference to FIG. 9. This embodiment may include cores 31A to 31C having different side geometries.

Figure 9A:
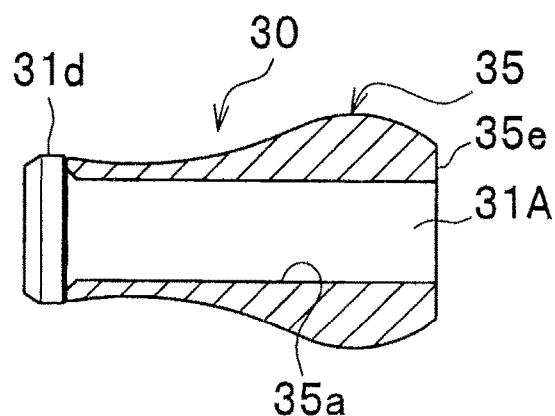
FIG. 9a is a sectional view of a core of a knob according to a fourth embodiment of the present invention.
Figure 9B:
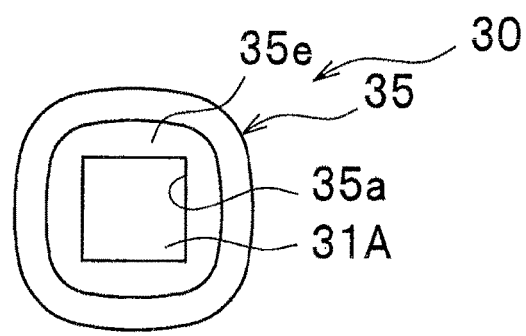
FIG. 9b is a side view of the core.

The knob 30 shown in FIGS. 9a and 9b may include a core 31A in a generally quadrangular prism shape having a square side geometry (longitudinal section). Such a core 31A may cause the grip member 35 to deform and bulge such that the side geometry of the grip member 35 is a generally square shape similar to that of the core 31A.

Figure 9C:
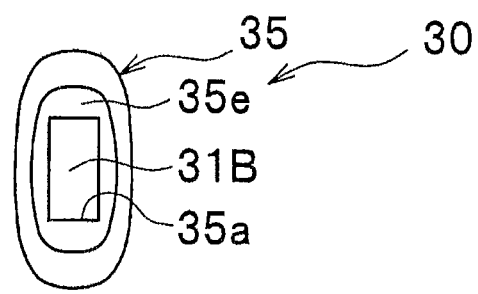
FIG. 9c is another side view of the core.

The knob 30 shown in FIG. 9c may include a core 31B in a generally quadrangular prism shape having a rectangular longitudinal section (side geometry). Such a core 31B may cause the grip member 35 to deform and bulge such that the side geometry of the grip member 35 is a rectangular shape similar to that of the core 31B.

Figure 9D:
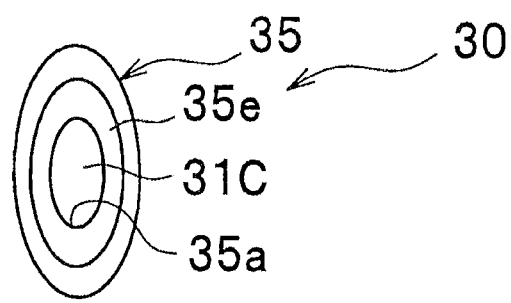
FIG. 9d is still another side view of the core.

The knob 30 shown in FIG. 9d may include a core 31C in a generally elliptic cylindrical shape having an elliptic longitudinal section (side geometry). Such a core 31C may cause the grip member 35 to deform and bulge such that the side geometry of the grip member 35 is an elliptic shape similar to that of the core 31C.

In this embodiment, use of the cores 31A to 31C having different side geometries may make the outer shape of the grip member 35 similar to those of the cores 31A to 31C, providing wide variation of knobs 30.

Fifth Embodiment

Next, the fifth embodiment of the knob of a fishing reel will now be described with reference to FIG. 10. This embodiment may include cores 31D to 31F having a tapered shape that is thicker from the distal end toward the flange portion 31d.

Figure 10A:
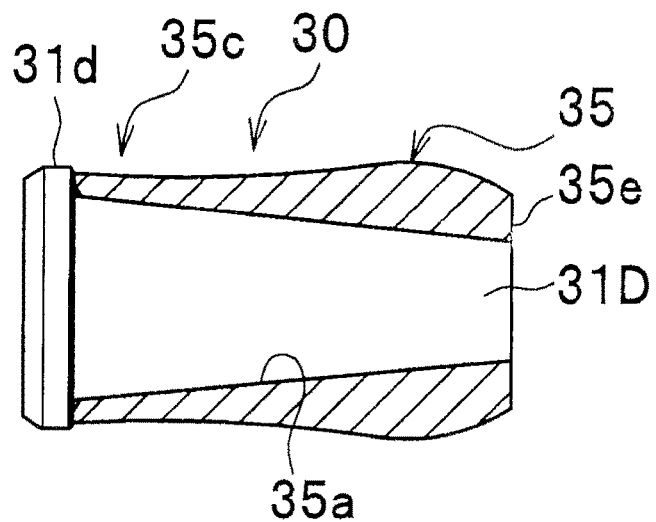
FIG. 10a is a sectional view of a core of a knob according to a fifth embodiment of the present invention.
Figure 10B:
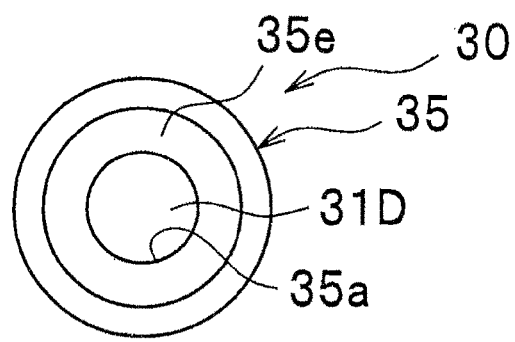
FIG. 10b is a side view of the core.

The core 31D shown in FIGS. 10a and 10b may have a circular side geometry and have a generally cylindrical shape with its diameter increasing toward the flange portion 31d.

Figure 10C:
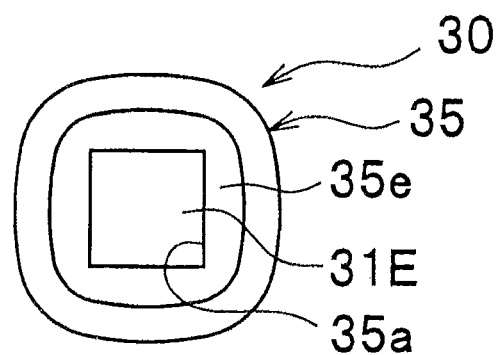
FIG. 10c is another side view of the core.

The core 31E shown in FIG. 10c may have a square side geometry and have a generally quadrangular prism shape with its longitudinal sectional area increasing toward the flange portion 31d.

Figure 10D:
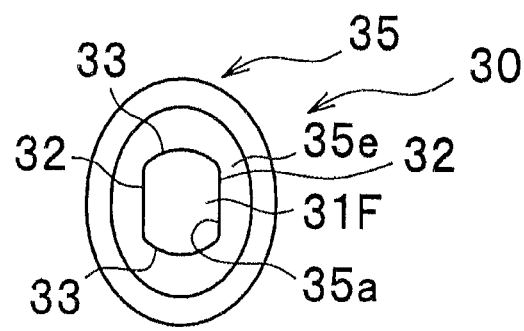
FIG. 10d is still another side view of the core.

The core 31F shown in FIG. 10d may have a generally rectangular side geometry with a pair of plain surfaces 32 and a pair of curved surfaces 33 and have a generally quadrangular prism shape with its longitudinal sectional area increasing toward the flange portion 31d.

Since the cores 31D to 31F may have tapered shapes that are thicker from the distal end toward the flange portion 31d, and thus a grip member 35 can be readily fitted round these cores.

Further, the tapered surfaces cause the proximal portion 35c of the grip member 35 to deform and bulge more extensively than the side end surface 35e, enabling secure gripping of the knob 30. Thus, the handle can be operated with a sufficient operational power.

Sixth Embodiment

Next, the sixth embodiment of the knob of a fishing reel will now be described with reference to FIG. 11. This embodiment may include cores 31G, 31H having a tapered shape that is thinner from the distal end toward the flange portion 31d.

Figure 11A:
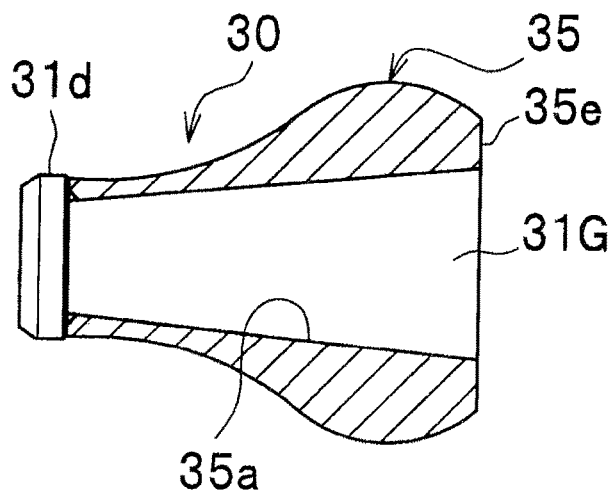
FIG. 11a is a sectional view of a core of a knob according to a sixth embodiment of the present invention.
Figure 11B:
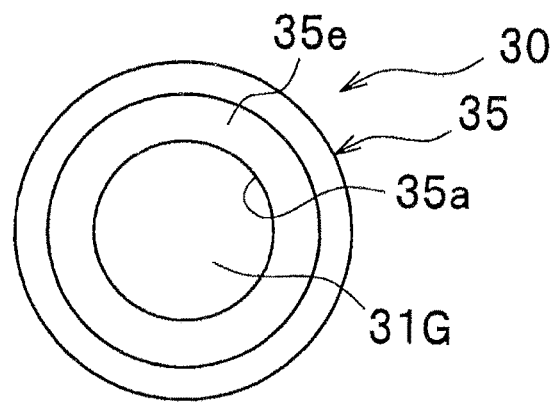
FIG. 11b is a side view of the core.

The core 31G shown in FIGS. 11a and 11b may have a circular side geometry and have a generally cylindrical shape with its diameter decreasing toward the flange portion 31d.

Figure 11C:
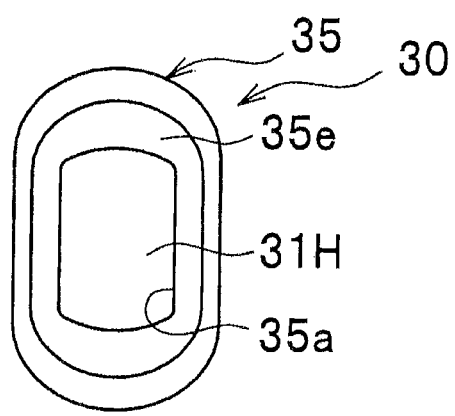
FIG. 11c is another side view of the core.

The core 31H shown in FIG. 11c may have a generally rectangular side geometry with a pair of plain surfaces 32 and a pair of curved surfaces 33 and have a generally quadrangular prism shape with its longitudinal sectional area decreasing toward the flange portion 31d.

Since the cores 31G to 31H may have tapered shapes that are thinner from the distal end toward the flange portion 31d, which may make the grip member 35 less prone to come off and increase the strength of the fixing.

Seventh Embodiment

Figure 12A:
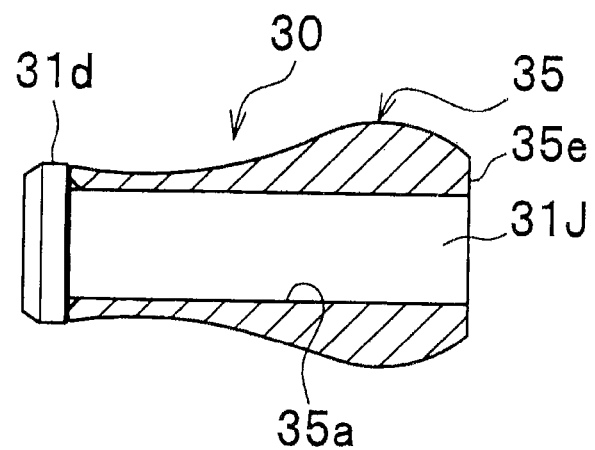
FIG. 12a is a sectional view of a core of a knob according to a seventh embodiment of the present invention.
Figure 12B:
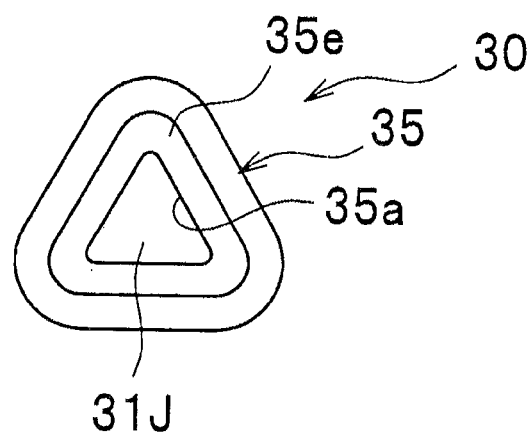
FIG. 12b is a side view of the core.

Next, the seventh embodiment of the knob of a fishing reel will now be described with reference to FIG. 12. This embodiment may include a core 31J in a generally triangular prism shape having a triangular side geometry (longitudinal section).

Such a core 31J may cause the grip member 35 to deform and bulge such that the side geometry of the grip member 35 is a generally triangular shape similar to that of the core 31J.

Further, each angle of the triangle of the core 31J may sharply dig into the inner surface 35a of the grip member 35, which may increase the strength of fixing the grip member on the core.

Further, since each angle of the triangle of the core 31J may sharply dig into the inner surface 35a of the grip member 35, the grip member 35 may be suitably prevented from sliding round the axis of the core 31J.

In operation of the knob 30, the grip member 35 can be pinched with three fingers (thumb, forefinger, and middle finger) each placed on one of the surfaces of the triangular prism of the grip member 35, and thus can be readily gripped and rotated.

In the above first to seven embodiments, the grip members 35 may have one same shape, but this is not limitative; and the grip members 35 may also have various outer shapes.

Additionally, the grip members 35 do not necessarily have a size sufficient to radially cover the entirety of the cores 31, 31A, etc. but may radially cover a part (a plurality of parts) of the cores 31, 31A, etc. The cores 31, 31A, etc. may be partially exposed through the grip member 35.

In the above embodiments, the described knobs 30 may be applied to spinning reels 1; and the knobs 30 can also be suitably provided on a handle of double-bearing fishing reels.

Additionally, the knobs 30 in the above embodiments can also be suitably used as other knobs provided on fishing reels, such as brake knobs.

What is claimed is:

1. A knob of a fishing reel, comprising:
a core rotatably supported via a spindle; and
a tubular grip member formed of an elastic material and fitted round the core,
wherein the core is provided with a deformation-applying portion for contacting an inner surface of the grip member and causing an outer shape of the grip member to deform and bulge in a direction orthogonal to an axis of the spindle;
wherein the core has a different cross-sectional shape from the grip member.

2. The knob of a fishing reel according to claim 1, wherein the inner surface of the grip member is cylindrical; and the sectional shape of the deformation-applying portion in the direction orthogonal to the axis is noncircular.

3. The knob of a fishing reel according to claim 2, wherein the sectional shape of the deformation-applying portion is polygonal.

4. The knob of a fishing reel according to claim 1, wherein the deformation-applying portion is provided with a locking portion for locking the inner surface of the grip member.

5. The knob of a fishing reel according to claim 1, wherein the core is formed such that its longitudinal sectional area is uniform.

6. The knob of a fishing reel according to claim 1, wherein the core is formed such that its longitudinal sectional area increases toward its proximal end.

7. The knob of a fishing reel according to claim 5 or 6, wherein the grip member is formed such that its proximal end is thinner than its distal end.

8. A method of fabricating a knob of a fishing reel including a core rotatably supported via a spindle and a tubular grip member formed of an elastic material and fitted round the core, the core having a deformation-applying portion in an outer surface thereof, the method comprising the step of:
pressing, in the course of fitting the grip member round the core, the deformation-applying portion against an inner surface of the grip member to cause elastic deformation of the grip member, such that an outer shape of the grip member deforms and bulges in a direction orthogonal to an axis of the core;
wherein the core has a different cross-sectional shape from the grip member.

* * * * *